(12) United States Patent
Reese et al.

(10) Patent No.: US 7,450,258 B2
(45) Date of Patent: Nov. 11, 2008

(54) SYSTEMS AND METHODS FOR REMOTE MANAGEMENT OF PRINTING DEVICES

(75) Inventors: Curtis Reese, Boise, ID (US); Michael Hardcastle, Boise, ID (US); William A. Cox, Melbourne, FL (US); Gregory Nutt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 10/725,169

(22) Filed: Dec. 1, 2003

(65) Prior Publication Data

US 2004/0109027 A1 Jun. 10, 2004

Related U.S. Application Data

(63) Continuation-in-part of application No. 09/708,770, filed on Nov. 7, 2000, now abandoned.

(51) Int. Cl.
*G06F 15/00* (2006.01)
*G06F 15/16* (2006.01)
(52) U.S. Cl. .................................. 358/1.15; 709/227
(58) Field of Classification Search ............... 358/1.15, 358/1.13; 345/156, 2.2; 710/39, 200, 220; 709/206, 229, 227; 713/182
See application file for complete search history.

(56) References Cited

U.S. PATENT DOCUMENTS 6,148,346 A * 11/2000 Hanson ........................ 719/321
2003/0048470 A1 3/2003 Garcia

FOREIGN PATENT DOCUMENTS

EP 0930748 B1 7/1999
GB 2378790 A 2/2003

OTHER PUBLICATIONS

International Search Report for Application No. PCT/US2004/039924, Report issued Dec. 15, 2005.

* cited by examiner

*Primary Examiner*—Saeid Ebrahimi Dehkordy

(57) ABSTRACT

Systems and methods are described herein for remote management of printing devices of various types within an enterprise. Printers that are not as well-equipped for printing device management (e.g. legacy printing devices and low-end printing devices) are taken into account by assigning printing device management elements and functions that are present in more modern higher-end printing devices to one or more host computers. As a result, printing device management tasks can be similarly applied to all types of enterprise printing devices without having to use multiple user interfaces or user processes.

25 Claims, 3 Drawing Sheets

SYSTEMS AND METHODS FOR REMOTE MANAGEMENT OF PRINTING DEVICES

RELATED APPLICATION

This application is a continuation-in-part of U.S. patent application Ser. No. 09/708,770 filed Nov. 7, 2000 now abandoned, entitled "Systems and Method For Remote Management Of Printing Devices", by Nutt et al., and assigned to Hewlett-Packard Corp.

TECHNICAL FIELD

The systems and methods described herein generally relate to managing printing devices. More particularly, the systems and methods described herein relate to managing printing devices from a remote location.

BACKGROUND

Managing a group of printing devices in, for instance, a large enterprise is an important undertaking to make the most efficient use of the printing devices and materials and components used in the printing devices. Printing device management entails (1) periodic gathering data from printing devices, status tracking, manipulating printing device settings, updating printing device software, etc. as well as (2) receiving asynchronous notification of service need from the printer. Failure to properly manage printing devices can result in printing device down time, printing devices that have operational software that is incompatible with one or more computers that otherwise could utilize the printing device, inefficient ordering of replacement supplied, etc.—all of which result in a higher operational cost for the printing devices.

More and more enterprises utilize modern printing devices that include an embedded web server and/or embedded web client that may be implemented, for example, using an embedded virtual machine that enable the printing devices to handle many printing device management functions. Using such web client capabilities, printing devices can be configured to actively access a network website to, for example, automatically report usage and/or maintenance data, re-order consumable supplies, download new versions of software, etc.

However, many legacy printing devices remain in service that do not support such active functionality and must be accommodated in printing device management systems. There is also a trend to make printing devices that are less expensive because they lack large amounts of memory, web servers, web clients, active reporting features, etc. Many new printing devices are available that emphasize a small footprint to make the printing devices more desktop friendly.

An up-to-date printing device management system must take into account legacy printing devices and low-end printing devices as well as more modern and highly functional printing devices so that an entire range of printing devices may be utilized in a single system without impacting printing device management efficiency.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
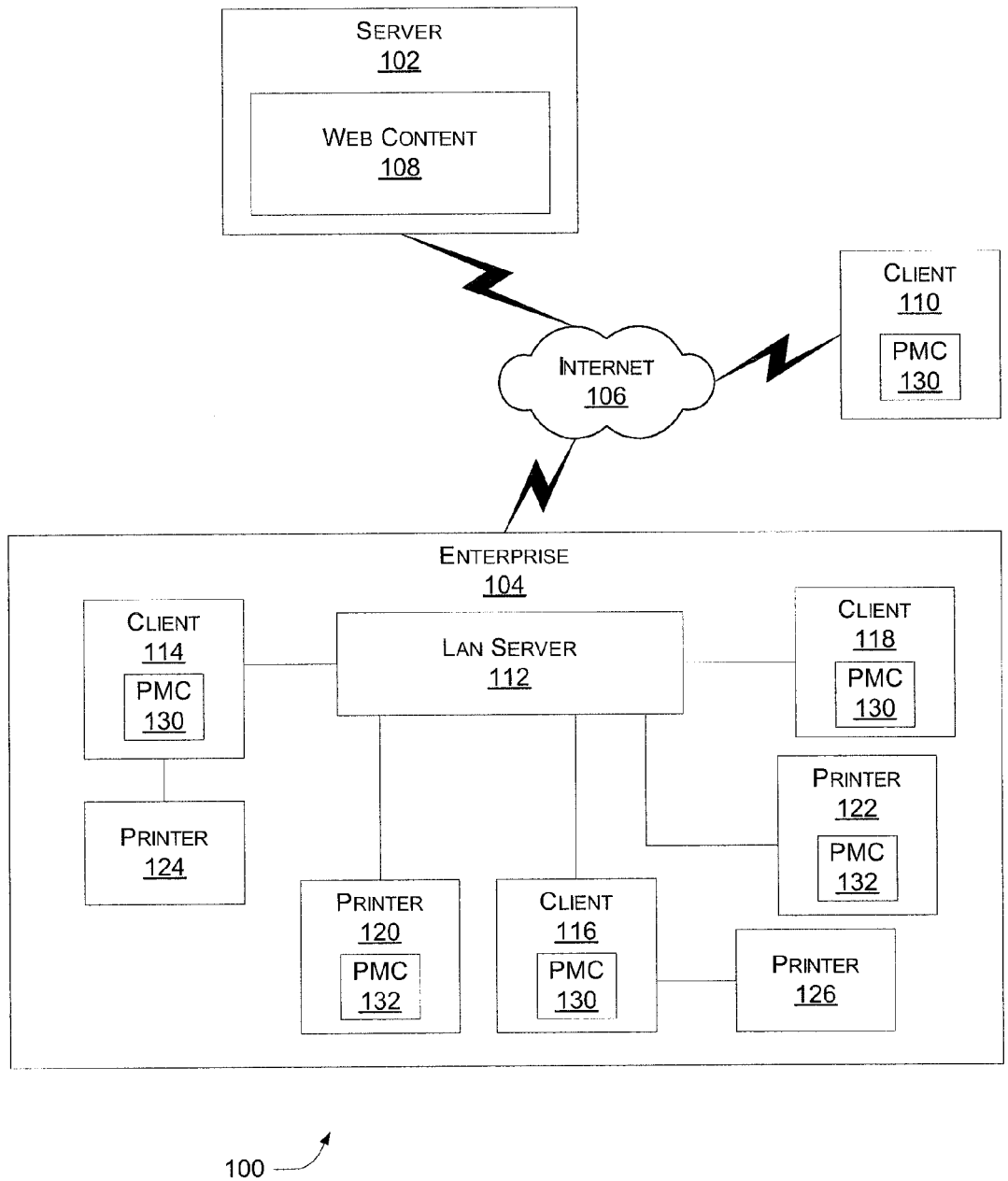
FIG. 1 is a high-level block diagram of an example of an embodiment of a distributed system that includes multiple printing devices connected, directly or indirectly, to a network.

The following description sets forth one or more specific implementations and/or embodiments of systems and methods for remote management of printing devices. The systems and methods incorporate elements recited in the appended claims. These implementations/embodiments are described with specificity in order to meet statutory written description, enablement, and best-mode requirements. However, the description itself is not intended to limit the scope of this patent.

Also described herein are one or more exemplary implementations and/or embodiments of systems and methods for remote management of printing devices. Applicant intends these exemplary implementations and/or embodiments to be examples only. Applicant does not intend these exemplary implementations and/or embodiments to limit the scope of the appended claims. Rather, Applicant has contemplated that the claimed systems and methods might also be embodied and implemented in other ways, in conjunction with other present or future technologies.

Computer-Executable Instructions

An implementation of a system and/or method for remote management of printing devices may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments, including hardware modules, software modules, or one or more components including hardware and software elements.

Computer-Readable Media

An implementation of a system and/or method for remote management of printing devices may be stored on or transmitted across some form of computer-readable media. Computer-readable media can be any available media that can be accessed by a computer. By way of example, and not limitation, computer readable media may comprise "computer storage media" and "communications media."

The term "computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile/video disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

The term "printing device" as used herein means an electronic device that includes a printing function of forming characters on a print medium using a printing material or a virtual printing function or storing information in "computer storage media" that could be used in printing at a later time. Examples of printing devices include, but are not limited to, laser printers, ink printers, dry media printers, thermal printers, facsimile (fax) machines, copiers, plotters, all-in-one machines, and the like. It is noted that use of the term "printer" herein refers not only to a printing device but also to any other type of printing device.

In the exemplary systems described herein, a host computing device includes remote printer management functionality similar to that found in modern printers that include printer management capabilities ("management-enabled" devices). When working in conjunction with a printing device that does not have such capabilities or has limited capabilities (e.g. printers that cannot passively serve browser content on a network such as with a web server, or cannot actively provide printer data on a network such as with a web client—"non-management-enabled" devices), the host computing device may, if applicable, display a user interface similar or identical to a user interface that is displayed on the computing device when working with printers that include printer management capabilities. One difference, however, is that for printers without said capabilities, the host computer accesses dynamic printer information (such as may be included on one or more web sites) instead of the printing device doing so. The printer may play either a passive role where it behaves like a server, providing information to the host computer only when requested or an active role where it provides information to the host computer as necessary without request.

The interface between the host computer and the printer could be through a variety of communications media. The computer and printer could also use variety of different communication protocols. These communications media and protocols may or may not be the same as those described above.

As a result, the host computer may obtain the information needed to manage any type of printer and, optionally, display the information and user options to a host computer operator in a similar interface. This makes it easier to appropriately manage all printing devices within a printing group or an enterprise and provides better printer management results.

In one or more described embodiments, management-enabled printing devices can be accessed by a management computer that is located within an enterprise or outside the enterprise to provide information to the host computer or receive information from the host computer. In at least one printer management implementation, the management-enabled printing devices can access a website (typically operated by a manufacturer of the printing device) to obtain a current application for the printing device that, among other things, provides a user interface to the host computer. By accessing a location that is strictly maintained, conformance with the latest available management software is assured.

For non-management-enabled printing devices, the same function is performed by the host computer. In other words, the host computer extends the functionality of the non-management-enabled printer so that in combination with the host computer, it functions in a manner similar to the management-enabled printer.

The host computer may first identify a model of the printing device. In the above mentioned printer management implementation, the host computer can access the web site and obtain current information related to the printing device.

Non-management enabled printing devices include interface logic that exposes all printing device software necessary for printer management. Such interface logic may be logic that is already present in the non-management printer such as PML (Printer Management Language) or it may include custom "stub" logic that can be added to the non-management enabled printer using its accessibility interfaces. In either case, the host computer and the printer software (i.e. firmware) can communicate directly to access the data needed for printer management.

For elements of a printer management architecture above the level of the host computer, there is no significant, apparent difference between the behavior of the management enabled and the non-management enabled printer with its host computer. As a result, a user handling the printer management tasks does not see a difference whether working with management-enabled printers or non-management-enabled printers.

Exemplary Distributed System

FIG. 1 is a high-level block diagram of an embodiment of a distributed system 100 that includes multiple printing devices connected, directly or indirectly, to a network. The system 100 includes a server 102 and an enterprise 104 that communicate over a network, such as the Internet 106. The server 102 stores web content 108 that is available to other entities via the Internet 106. A remote client computer 110 is shown connected to the Internet 106. The client computer 110 is able to communicate with the server 102 and with the enterprise 104 via the Internet 106.

The enterprise 104 includes a local area network (LAN) server 112 that provides network services for enterprise client computers 114, 116, 118. Network printer 120 and network printer 122 are directly connected to the LAN server 112 and are available to accept print jobs from the client computers 114, 116, 118 and the server 112. Although specifically shown as printers 120, 122, the printers 120, 122 may be any type of printing devices as mentioned previously. Printer 124 is connected directly to client 114 and printer 126 is connected directly to client 116.

The remote client computer 110 and enterprise client computers 114, 116, 118 include a printer management component 130 that allows access to and management of enterprise printers. Network printers 120, 122 also include a printer management component 132 that provides printer management functionality to the network printers 120, 122. The other printers 124, 126 do not include a printer management component.

The enterprise 104, therefore, includes printers that are connected directly to the network as well as printers that are directly connected to network clients. Furthermore, the enterprise 104 includes at least one printer that is management-enabled and at least one printer that is non-management-enabled. As shown in the described example, all the client computers 114, 116, 118 in the enterprise 104 include the printer management component 130 and, therefore, each can manage the printers in the enterprise.

Although only a limited number of client computers and printing devices are shown in the present example, it is noted that virtually any number of printing devices accessible from a client computer—within the enterprise 104 or via the Internet 106 or other network—can be managed by the systems and methods described herein.

Exemplary Client Computer

Figure 2:
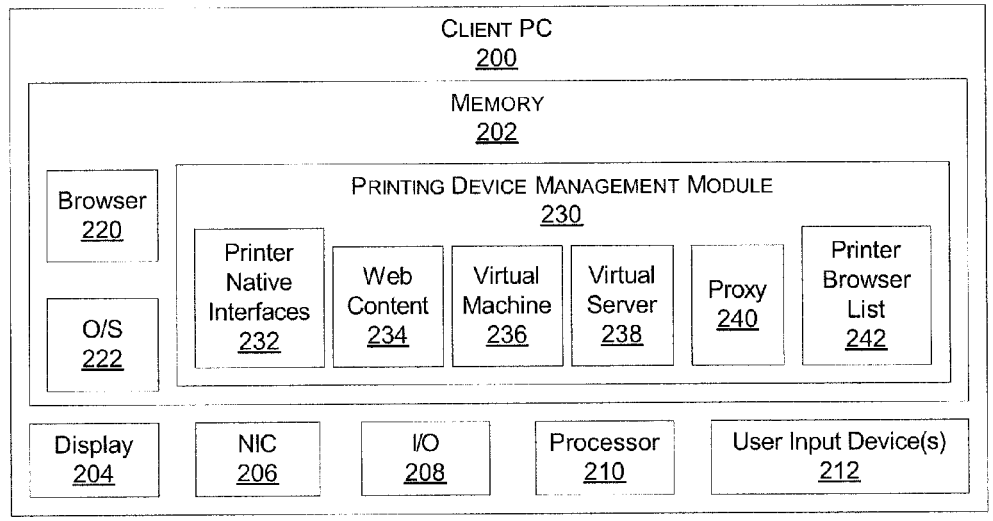
FIG. 2 is a block diagram of an exemplary embodiment of a computing device in accordance with the claimed invention.

FIG. 2 is a block diagram of an exemplary embodiment of a client computing device 200 in accordance with the claimed invention. The client device 200 is similar to the client devices 110, 114, 116, 118 shown in FIG. 1.

The client device 200 includes memory 202, a display 204, a network interface card 206 for connecting to a LAN or an external network, and an input/output (I/O) module 208 that can be used to connect a printing device directly to the client device 200. The client device 200 also includes a processor 210 and one or more user input devices 212 (e.g. mouse, keyboard, etc.) for accepting user input.

The memory 202 stores a browser 220, an operating system 222 and a printing device management component 230 (similar to the printer management components 130 shown in FIG. 1). The printing device management component 230 includes printer native interfaces 232 for one or more printers that allow the client device 200 to communicate directly with printing device firmware in the printer's native language instead of first having to convert commands to a printer management language (PML), or simple network management protocol (SNMP), or the like to communicate with the printer firmware. This allows the client to communicate with a printing device at a low level, which is more efficient. The printer native interfaces 232 are typically JAVA language interfaces, but this is not particularly required.

The printing device management component 230 also includes web content 234 downloaded from a server (102, FIG. 1) and related to a specific printing device. As will be discussed below, when the client is communicating with a printer for printer management purposes, the client will access the Internet and locate web data specific to the printer, which is—at least in part—downloaded to the client. The web content provides a user interface on the client for printer management purposes.

The printing device management component 230 also includes a virtual machine 236 that provides an execution environment for (i.e. control of) printing device management component 230 services. A virtual server 238 and a proxy 240 are included in the printing device management module 230 and work together to provide a server-type mechanism for serving web content via the client PC 200. The virtual server 238 and proxy 240 function to serve web content pages related to a non-management enabled printing device so that it appears to a user that the printing device is management-enabled. In other words, a user will not be able to tell a difference between working with a non-management enabled printing device and a management enabled printing device.

In at least one implementation, a printer browser list 242 is stored in the printing device management component 230 and includes a list of printing devices that are management-enabled, i.e. including browsing capabilities. The printer browser list 242 may be referenced to determine if a particular printing device is management-enabled or not.

Exemplary Printing Device

Figure 3:
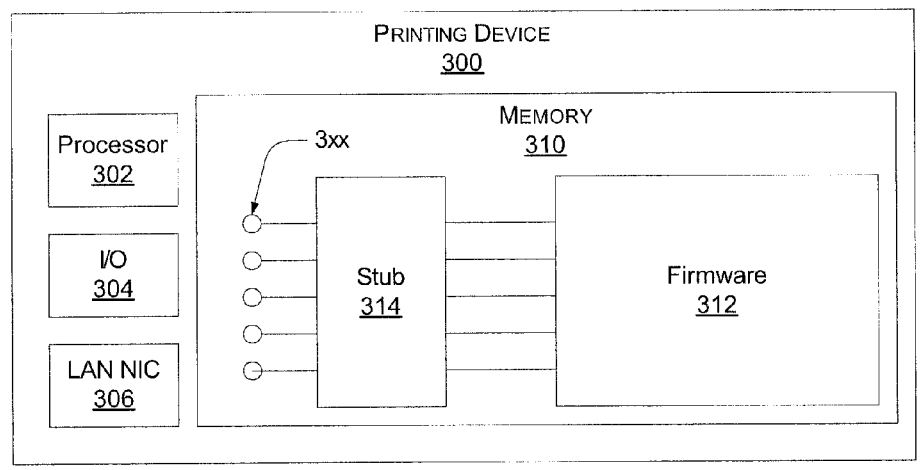
FIG. 3 is a block diagram of an exemplary embodiment of a printing device in accordance with the claimed invention.

FIG. 3 is a block diagram of an exemplary embodiment of a printing device in accordance with the claimed invention. As previously noted, the printing device 300 may be any type of electronic device that includes a printing function or virtual printing function, such as a laser printer, an ink printer, a dry media printer, a fax machine, a copier, a plotter, digital presses, and the like.

The printing device 300 includes a processor 302, an input/output (I/O) module 304 and a network interface card (NIC) 306. The printing device 300 may be directly connected to a host computer via the I/O module 304 or it may be connected to a network (such as a LAN, the Internet, etc.) via the NIC 306, or both.

The printing device 300 also include memory 310, which stores firmware 312 and a stub 314 that exposes low-level interfaces 316 of the firmware 312, in this case, to the printer native interfaces 232 of the client device 200 shown in FIG. 2. It is noted that the printing device 300 shown in FIG. 3 is a printing device that does not include an embedded virtual machine or embedded web server that allow for the printing device 300 to independently handle printer management functions. The printing device 300 is a legacy printer or low-end printer that is not provided with such functionality, which must therefore be provided by the client device 200 shown in FIG. 2.

The elements and functionality features of the printing device 300 and the client device 200 (FIG. 2) will be discussed in greater detail below, with respect to FIG. 4.

Methodological Implementation: Remote Printing Device Management

Figure 4:
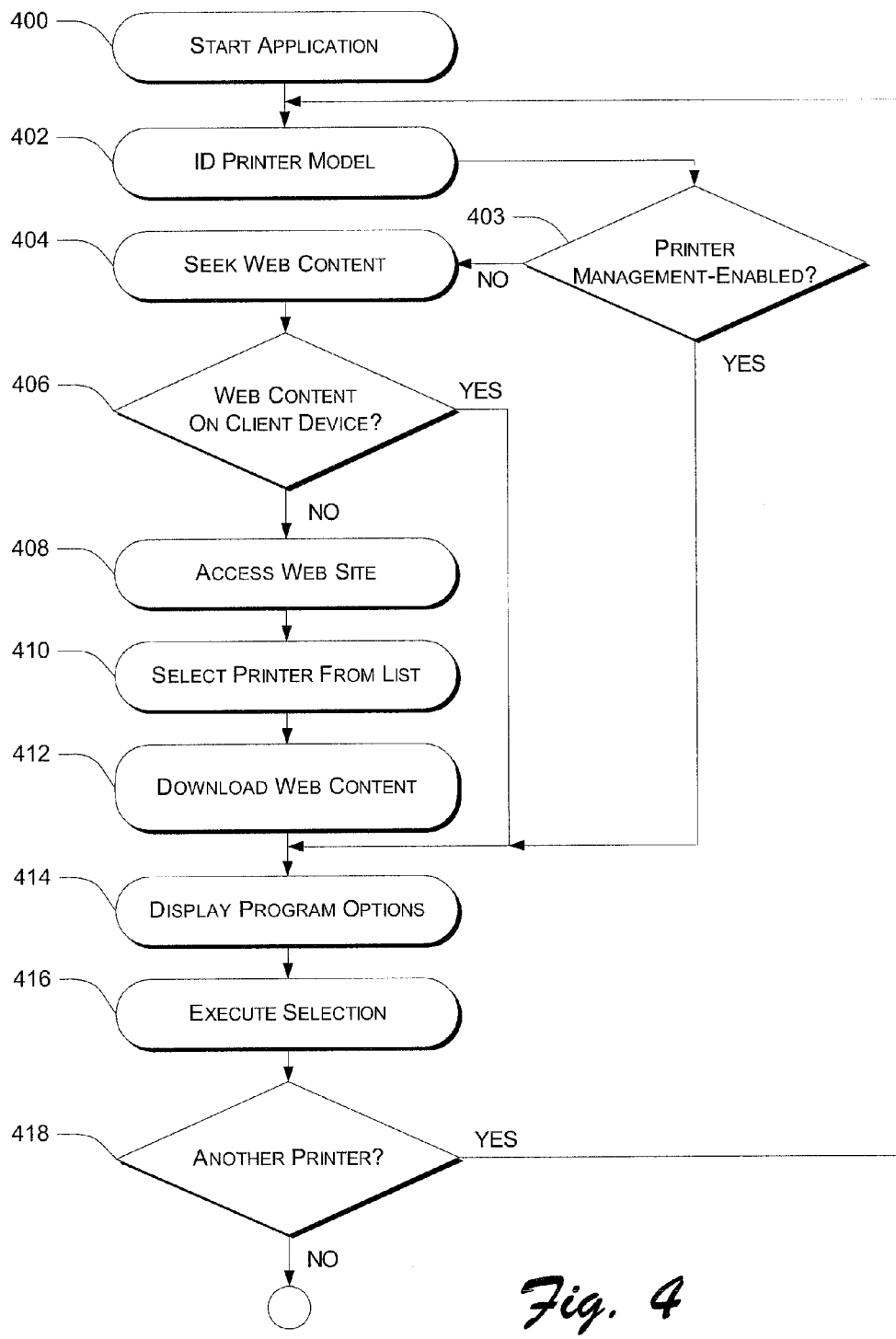
FIG. 4 is flow diagram depicting an exemplary methodological implementation of an embodiment of a remote printing device management system.

FIG. 4 is a flow diagram depicting an exemplary methodological implementation of an embodiment of a remote printing device management system. In the following discussion of FIG. 4, continuing reference will be made to the elements and reference numerals shown in the previous figures.

At block 400, a user preparing to run printer management functions initiates the virtual machine 236 (application) of the printing device management component 230. The printing device management component 230 is configured to locate printing devices on a network or within an enterprise or system and perform printer management operations thereon (under control of the virtual machine 236). After a printing device is located, the printing device management component 230 identifies a printer model at block 402.

The printing device management component 230 determines whether or not the identified printer includes an embedded web server, i.e. if the printer is management-enabled (block 403). There are several techniques that may be employed for determining whether a printer is management-enabled or not. In at least one implementation, the printer browser list 242 is referenced regarding a particular model of printing device. If the model is included in the list, then that particular model includes a web browser and is management-enabled. The printer browser list 242 may be included with an initial installation of the printing device management component 230 and subsequently updated from a vendor web site.

In an alternative implementation, the printing device management component 230 is configured to explore a printing device to determine the presence—or lack thereof—of a web browser proper or web browser-related program items.

If the printer is management-enabled ("Yes" branch, block 403), then the process continues at block 414, where the web content is displayed on the client 200 to show program options, or selections available to the user. If the printer is non-management-enabled ("No" branch, block 403), then the process continues at block 404.

At block 404, the virtual machine 236 attempts to locate web content or program data related to the printer model identified at block 402. If the web content is already located on the client device 200 ("Yes" branch, block 406), then the process continues at block 414, where the web content is displayed on the client 200 to show program options, or selections available to the user.

If the web content is not located on the client device 200 ("No" branch, block 406), then the client device 200 accesses the web content 108 on the server 102 at block 408. The web content 108 should include most, if not all, web content for all printing devices that might be encountered on the system or enterprise. However, it is likely that the web content 108 will only contain information about a particular brand of printing devices.

A list of printing devices for which web content is available is browsed by the printing device management component 230 and the appropriate content related to the printing device model identified at block 402 is selected at block 410. Web content related to the selection is downloaded to the client device 200 at block 412.

At block 414, printer management program options are displayed on the display 204 of the client device 200 so that a user may select a program option. A selected option is executed at block 416. If there is another printing device to manage ("Yes" branch, block 418), then the process reverts to block 402 and the process is repeated. If no other printing device is available, i.e. all printing devices have been managed in the current cycle ("No" branch, block 418), then the process terminates.

It is noted that the process outlined in FIG. 4 deal with non-management-enabled printing devices. The process shown may be combined with a similar process for management-enabled printing devices if there are any such printing devices in the system or enterprise.

When a printer management program encounters a management-enabled printing device, then particular steps of the process will be taken care of by the printing device itself, such as accessing current web content on the server 102 and/or providing a user interface for the printer management function as related to the particular model of that printing device.

When the printer management program encounters a non-management-enabled printing device, those and other functions may be carried out on the client device 200. As a result, the difference will be transparent to a printer management operator. The operator will see the same interface for both types of printing devices, and the most current version of management software will be provided by accessing the server 102.

When new versions of printer management software are available, there is no logistical problem encountered in distributing the new software to each enterprise and installing the software on each client device and/or printing device. Also, all printing devices within an enterprise may be managed contemporaneously and in a similar way. This maximizes printing device management efficiency and reduces costs for operating multiple printing devices.

CONCLUSION

Implementation of the systems and methods described herein provide efficient ways for remote printing device management. Printing device management system operators are provided with similar interfaces to make related tasks easier to learn and execute on all printing devices in the enterprise without regard for where certain printer management functions occur. Legacy printing devices and low-end printing devices together with modern high-end printing devices are maintained in a similar manner in a similar time frame (in most instances) to result in all printing devices within a system or enterprise being managed with optimum efficiency.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:

determining if a printing device connected to a network has a browsing capability;

determining that the printing device is a management-enabled printing device if the printing device has the browsing capability, and determining that the printing device is a non-management-enabled printing device if the printing device does not have the browsing capability;

accessing printing device management content related to the non-management-enabled printing device via a client device connected to the non-management-enabled printing device if the printing device does not have the browsing capability, the printing device management content located on a network site and including native interfaces for accessing printing device firmware of the non-management-enabled printing device in a native language of the non-management-enabled printing device;

providing a user interface related to the printing device management content of the non-management-enabled printing device on the client device if the printing device does not have the browsing capability, the user interface including one or more user-selectable items, each user-selectable item being associated with a printing device management function available in the printing device management content of the non-management-enabled printing device;

obtaining the printing device management content including the native interfaces from the network site via the management-enabled printing device, and providing the user interface including the one or more user-selectable items each associated with a printing device management function to the client device from the management-enabled printing device if the printing device has the browsing capability;

receiving a user selection of at least one user-selectable item; and executing the printing device management function associated with the user selection.

2. The method as recited in claim 1, wherein if the printing device does not have the browsing capability, the executing further comprises communicating with the printing device firmware at a low level between the native interfaces and a stub located on the non-management-enabled printing device, the stub exposing multiple firmware interfaces.

3. The method as recited in claim 1, wherein determining if the printing device has the browsing capability includes determining whether the printing device includes an embedded web server.

4. The method as recited in claim 1, wherein the printing device is directly connected to the network.

5. The method as recited in claim 1, wherein the printing device is indirectly connected to the network.

6. The method as recited in claim 1, wherein the network site is an Internet site.

7. The method as recited in claim 1, wherein the printing device management function further comprises a function that harvests data from the non-management-enabled printing device.

8. The method as recited in claim 1, wherein the printing device management function further comprises a function that modifies printing device settings of the non-management-enabled printing device.

9. The method as recited in claim 1, wherein the printing device management function further comprises a function that transfers printing device software to the non-management-enabled printing device.

10. The method as recited in claim 1, wherein the network site further comprises a network site maintained by a manufacturer of the non-management-enabled printing device.

11. The method as recited in claim 1, wherein:
the printing device is a first printing device; and
the method is repeated for a second printing device connected to the network.

12. A system, comprising:
a client device;
a printing device group; and
a printing device management component configured to:
 access one of multiple printing devices in the printing device group;
 identify a model of the printing device;
 locate a set of printing device native interfaces for accessing firmware of the printing device in a native language of the printing device; and
 communicate with the printing device to execute a printing device management application with the printing device,
wherein, if the printing device does not have a browsing capability, the printing device is determined a non-management-enabled printing device, the printing device management component is provided on the client device, the client device is configured to obtain printing device management content including the printing device native interfaces from a network site, and the client device is configured to display a user interface for management of the non-management-enabled printing device,
wherein, if the printing device has a browsing capability, the printing device is determined a management-enabled printing device, the printing device management component is provided on the management-enabled printing device, the management-enabled printing device is configured to obtain the printing device management content including the printing device native interfaces from the network site, the management-enabled printing device is configured to provide the user interface for management of the management-enabled printing device to the client device, and the client device is configured to display the user interface for management of the management-enabled printing device.

13. The system as recited in claim 12, wherein the network site is a network site maintained by a manufacturer of the printing device.

14. The system as recited in claim 12, wherein the network site is a network site maintained by a manufacturer of the printing device.

15. The system as recited in claim 12, wherein the printing device management component is further configured to communicate with the printing device via a stub located on the printing device, the stub exposes low level firmware interfaces for the printing device.

16. The system as recited in claim 12, wherein the printing device management component is further configured to access at least one other printing device of the printing device group to execute the printing device management application with the other printing device.

17. One or more computer-readable media containing computer-executable instructions that, when executed on a computer, perform the following steps:
determining if a printing device is management-enabled, including determining that the printing device is management-enabled if the printing device has a browsing capability, and determining that the printing device is not management-enabled if the printing device does not have a browsing capability;
if the printing device is management-enabled:
 facilitating one or more printing device management functions of the printing device, including obtaining a user interface for the one or more printing device management functions from a network site via the printing device, and providing the user interface for the one or more printing device management functions to a client device from the printing device; and
if the printing device is not management-enabled:
 accessing printing device management content for the one or more printing device management functions of the printing device from the network site via the client device; and
 communicating with the printing device via low-level printing device native interfaces to carry out the one or more printing device management functions, the low-level printing device native interfaces being included in the printing device management content accessed from the network site via the client device and providing access to printing device firmware of the printing device in a native language of the printing device.

18. The one or more computer-readable media as recited in claim 17, wherein the determining step further comprises referencing a list that includes printing device model numbers and, if the list contains a model number of the printing device, determining that the printing device is management-enabled.

19. The one or more computer-readable media as recited in claim 17, wherein the determining step further comprises attempting to locate a browser in the printing device and, if a browser is found, determining that the printing device is management-enabled.

20. The one or more computer-readable media as recited in claim 17, wherein the determining step further comprises attempting to locate one or more software files exclusively related to a browser and, if found, determining that the printing device is management-enabled.

21. The one or more computer-readable media as recited in claim 17, wherein the facilitating step further comprises receiving user input for the printing device and displaying user output generated by the printing device.

22. The one or more computer-readable media as recited in claim 17, wherein the accessing printing device management content step further comprises accessing printing device management content on a web site.

23. The one or more computer-readable media as recited in claim 22, wherein the web site is a web site maintained by a manufacturer of the printing device.

24. The one or more computer-readable media as recited in claim 17, wherein the communicating step further comprises communicating with a stub located on the printing device, the stub exposing the printing device native interfaces.

25. The one or more computer-readable media as recited in claim 17, wherein the communicating step further comprises utilizing one or more native interfaces that are proprietary to a manufacturer of the printing device.

* * * * *